United States Patent
Frelich et al.

(10) Patent No.: US 9,382,675 B2
(45) Date of Patent: Jul. 5, 2016

(54) ELECTRIC POWERED SYSTEMS FOR PAVING MACHINES

(71) Applicant: Caterpillar Paving Products Inc., Brooklyn Park, MN (US)

(72) Inventors: Toby Andrew Frelich, Saint Michael, MN (US); Krishnakumar Dharapuram Ramamoorthy, Peoria, IL (US); Stephen Phelps, Peoria, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 14/305,663

(22) Filed: Jun. 16, 2014

(65) Prior Publication Data
US 2015/0361627 A1 Dec. 17, 2015

(51) Int. Cl.
*B60K 6/46* (2007.10)
*E01C 19/48* (2006.01)
*B60K 1/02* (2006.01)
*B60L 11/18* (2006.01)
*B60K 26/00* (2006.01)
*B60W 20/00* (2016.01)

(52) U.S. Cl.
CPC .............. *E01C 19/4853* (2013.01); *B60K 1/02* (2013.01); *B60K 6/46* (2013.01); *B60K 26/00* (2013.01); *B60L 11/1805* (2013.01); *B60L 11/1851* (2013.01); *B60W 20/00* (2013.01); *Y10S 903/903* (2013.01)

(58) Field of Classification Search
CPC .............. B60K 1/00; B60K 1/02; B60K 1/04; B60K 6/00; B60K 6/20; B60K 6/22; B60K 6/26; B60K 6/28; E01C 19/00; E01C 19/002; E01C 19/08; E01C 19/22; E01C 19/42; E01C 23/00

USPC ........ 180/65.245, 65.24, 65.1, 65.21, 65.285, 180/65.31
See application file for complete search history.

(56) References Cited

U.S. PATENT DOCUMENTS

| | | | |
|---|---|---|---|
| 5,354,189 A | 10/1994 | Mckinnon | |
| 5,848,659 A * | 12/1998 | Karg et al. | 180/65.245 |
| 6,193,437 B1 | 2/2001 | Heims | |
| 6,827,524 B2 * | 12/2004 | Starry et al. | 404/129 |
| 7,069,673 B2 * | 7/2006 | Kagoshima et al. | 37/348 |
| 7,201,244 B2 * | 4/2007 | Johnston et al. | 180/65.51 |

(Continued)

OTHER PUBLICATIONS

Hrabovcova, et al.; *"Output Power of Switched Reluctance Generator with Regard to the Phase Number and Number of Stator and Rotor Poles"*. article; 2011; pp. 25-30.

(Continued)

*Primary Examiner* — James M Dolak
(74) *Attorney, Agent, or Firm* — Miller, Matthias & Hull LLP

(57) ABSTRACT

A paving machine having electric powered systems in lieu of hydraulic systems for performing work at a work site may include an integrated generator operatively connected to a power source of the paving machine, such as an engine, to produce AC power. A power converter may receive the AC power and output DC power to electric motors, with each electric motor being operatively connected to a corresponding one of a plurality of mechanical components. The power converter may distribute power from the generator to the plurality of electric motors in response to commands to actuate the plurality of mechanical components input at an operator station. The electric powered systems may include propulsion devices, material conveyors, augers and the like.

4 Claims, 4 Drawing Sheets

(56) References Cited

U.S. PATENT DOCUMENTS

| | | | |
|---|---|---|---|
| 7,298,102 B2 * | 11/2007 | Sopko et al. | 318/139 |
| 7,354,221 B2 * | 4/2008 | Congdon | 404/84.1 |
| 7,609,024 B2 * | 10/2009 | Ahmad et al. | 318/811 |
| 7,856,302 B2 * | 12/2010 | Rasmussen | 701/50 |
| 7,950,481 B2 * | 5/2011 | Betz et al. | 180/65.31 |
| 8,186,906 B2 | 5/2012 | Zimmerman | |
| 8,342,774 B2 | 1/2013 | Fickeisen | |
| 8,386,131 B2 * | 2/2013 | Thaduvayi et al. | 701/48 |
| 8,439,598 B2 | 5/2013 | Norton | |
| 8,568,058 B2 | 10/2013 | Smieja | |
| 8,585,317 B1 * | 11/2013 | Sina | 404/117 |
| 8,628,271 B2 * | 1/2014 | Braun | 404/118 |
| 8,636,442 B1 | 1/2014 | Sopko, Jr. et al. | |
| 8,672,069 B2 * | 3/2014 | Cherney et al. | 180/65.245 |
| 9,222,228 B2 * | 12/2015 | Noll | E01C 19/48 |
| 2008/0292398 A1 | 11/2008 | Potts | |
| 2010/0326067 A1 | 12/2010 | Weiser et al. | |
| 2013/0322964 A1 | 12/2013 | Buschmann et al. | |

OTHER PUBLICATIONS

Ari Fin, et al.; "*State of the Art of Switched Reluctance Generator*"; article; Aug. 28, 2012; pp. 447-458.

* cited by examiner

ELECTRIC POWERED SYSTEMS FOR PAVING MACHINES

TECHNICAL FIELD

The present disclosure relates generally to construction and mining equipment, and more particularly, to systems and machines for providing and supplying power to mechanical elements of the machine by generating and storing electrical power.

BACKGROUND

Construction and mining equipment include various mechanical elements and systems that must be powered during operation. Paving machines, for example, are typically used for building roadways, parking lots, and the like, and function to deposit paving material, such as asphalt, on a paving surface to create a flat, consistent surface over which vehicles may travel. A paving machine at a construction site, such as an asphalt paver, is generally a state-of-the art self-propelled construction machine designed to receive, convey, distribute, profile and partially compact the asphalt material. The paving machine or tractor accepts heated asphalt material into a receiving hopper at the front of the machine, which is conveyed to the rear of the machine with parallel slat conveyors or other types of conveyors positioned at the bottom of the hopper. The asphalt material conveyed from the hopper is distributed along the width of an intended ribbon or mat by means of two spreading conveyors or opposing augers. The paving machine may further employ a screed towed behind the tractor and having vibratory and/or tamper mechanisms and heating elements to profile and compact the asphalt material into a mat on the paving surface.

The operation of the paving machine and its components may be manually controlled by an operator to dispense the asphalt material and create the mat on the paving surface. In many paving machines, systems are provided to automate and control the paving process for consistent operation of the paving machine for laying a uniform mat on the paving surface without defects compromising the integrity and longevity of the mat. The automation systems may include control over the speed of the paving machine, operation of the conveyors and augers to distribute the asphalt material, vertical positioning and temperature control of the screed, control of the screed or tamper vibrations, regulation of air ventilation and circulation through the machine and over the other mechanical and electrical elements, and the like. The control settings may be established during an initial setup process for a paving job, such as the paving of a stretch of a highway or the paving of a parking lot. Other construction and mining equipment typically have similar automation systems for performing the operations for which they are designed.

During the paving process, the various systems of the paving machine, such as the conveyors and the augers, propulsion and steering mechanisms, ventilation and cooling systems, hopper, auger and screed positioning systems, and screed tampers and heaters, operate as discussed above to form the desired mat in the manner known to those skilled in the art. Many or all of these systems may be driven by hydraulic pumps or motors which are indirectly operated by the power source of the paving machine. In typical paving machines, for instance, a power source, such as a gas or diesel internal combustion engine, has an output shaft which drives a pump drive. The pump drive, in turn, drives multiple pumps and/or motors providing pneumatic, hydraulic and mechanical power to the various systems of the paving machine.

This string of interconnected components as described results in parasitic losses and reduced efficiency that increase the overall cost of operating the machine. Actual implementation of such systems also tends to occupy more space on the paving machine, tractor and screed assembly and require fluid lines to be run between the pumps and motors and the driven elements. Some paving machine arrangements provide a more direct connection between a power source and a generator to provide power to electrical elements. For example, U.S. Pat. No. 8,636,442, issued on Jan. 28, 2014 and entitled, "Integrated Generator for Screed Plate Heat Up," discloses a paving machine with a power source such as an internal combustion engine that drives a pump drive with an integrated generator. The integrated generator outputs AC power to a power converter that in turn outputs DC power to a power distribution box in the screed for distribution of the power to the screed heating elements. The integrated generator provides power to the screed heating elements, but the paving machine still utilizes the pump drive and other hydraulic pumps and motors to provide power to the other mechanical elements. Moreover, a starter motor for turning over the engine and an alternator for charging the battery and powering the electrical systems when its engine is running are still implemented in paving machines.

In view of the inefficiencies and performance risks present in providing power to the mechanical elements and systems in the present paving machines and other construction and mining equipment, a need exists for improved electrical power generation and transmission within the machines during operation.

SUMMARY OF THE DISCLOSURE

In one aspect of the present disclosure, a paving machine for performing work at a work site is disclosed. The paving machine may have an operator station and may include a power source having an output shaft, a generator having an input shaft operatively connected to the output shaft of the power source to drive a rotor of the generator and produce alternating current (AC) power, a power converter operatively connected to the generator to transfer AC power between the generator and the power converter, and to output direct current (DC) power, a plurality of electric motors with each being operatively connected to the power converter to received DC power there from, and a plurality of mechanical components with each being operatively connected to a corresponding one of the plurality of electric motors. The power converter may distribute power from the generator to the plurality of electric motors in response to commands to actuate the plurality of mechanical components input at the operator station.

In a further aspect of the present disclosure, a method for distributing electrical power in a paving machine is disclosed. A paving machine may have an operator station, a power source, a generator operatively connected to the power source to generate electrical power, a power converter operatively connected to the generator to receive electrical power there from, a plurality of electric motors operatively connected to the power converter to receive electrical power there from, and a plurality of mechanical components each operatively connected to a corresponding one of the plurality of electric motors. The method may include detecting a command signal from the operator station for operating one of the plurality of mechanical components, and causing the power converter to output electrical power from the generator to the one of the plurality of electric motors corresponding to one of the plurality of mechanical components commanded to operate.

In another aspect of the present disclosure, a paving machine for performing work at a work site is disclosed. The paving machine may include an operator station, a power source having an output shaft, a generator having an input shaft operatively connected to the output shaft of the power source to drive a rotor of the generator and produce alternating current (AC) power, a power converter operatively connected to the generator to transfer AC power between the generator and the power converter, and to output direct current (DC) power, a plurality of electric motors with each being operatively connected to the power converter to received DC power there from, a plurality of mechanical components with each being operatively connected to a corresponding one of the plurality of electric motors, and a controller operatively connected to the operator station and the power converter. The controller may be configured to detect command signals from the operator station to actuate the plurality of mechanical components, and to cause the power converter to distribute power from the generator to the plurality of electric motors in response to detecting the command signals to actuate the plurality of mechanical components.

In a still further aspect of the present disclosure, a paving machine for laying a mat of paving material on a surface at a work site is disclosed. The paving machine may have an operator station, and may include a power source having an output shaft, a generator having an input shaft operatively connected to the output shaft of the power source to drive a rotor of the generator and produce alternating current (AC) power, a power converter operatively connected to the generator to transfer AC power between the generator and the power converter, and to output direct current (DC) power, a plurality of electric motors with each being operatively connected to the power converter to received DC power there from, and a plurality of paving components with each being operatively connected to a corresponding one of the plurality of electric motors. The power converter may distribute power from the generator to the plurality of electric motors in response to commands to actuate the plurality of paving components input at the operator station.

Additional aspects are defined by the claims of this patent.

DETAILED DESCRIPTION

Although the following text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term is expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

Figure 1:
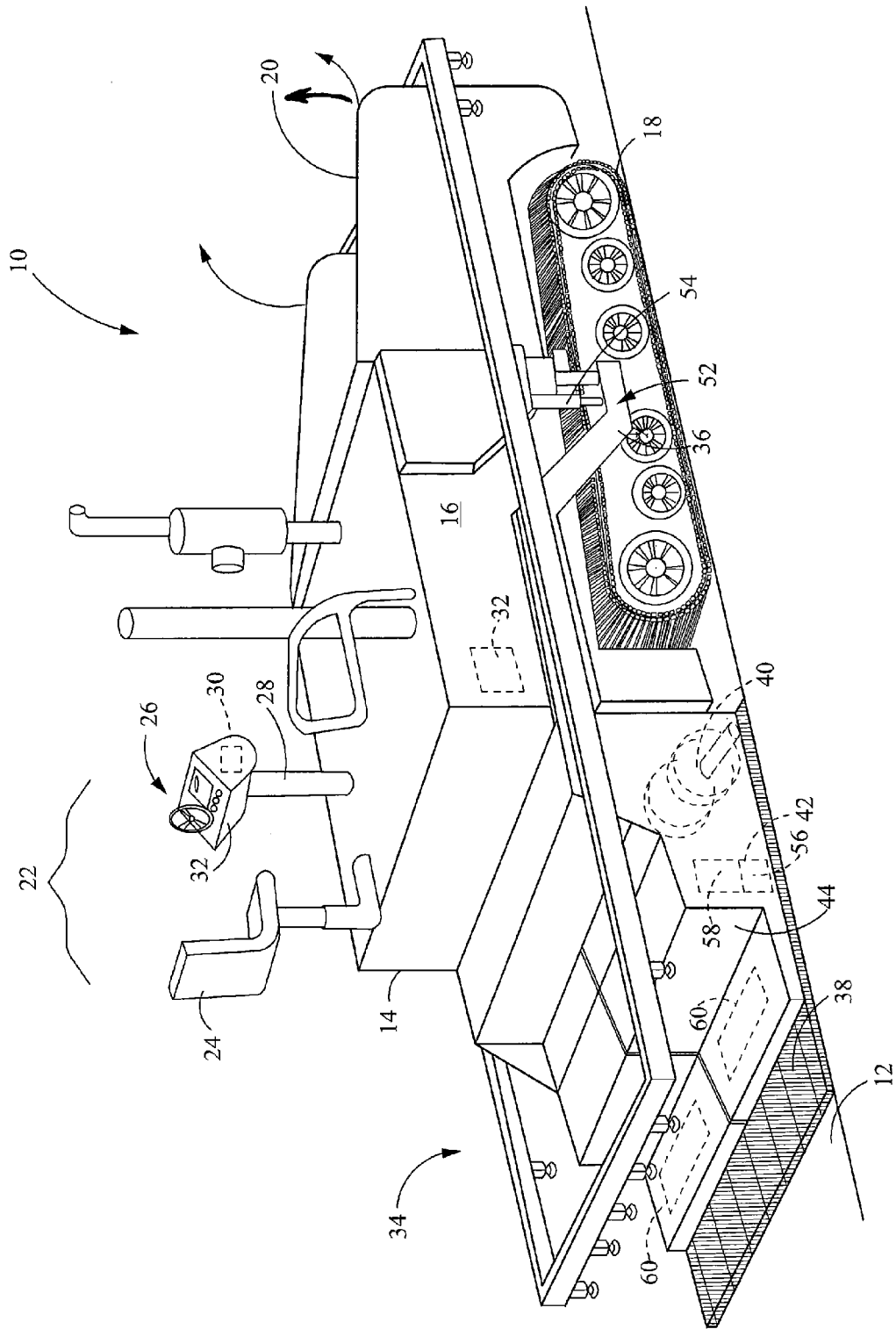
FIG. 1 is a perspective view of a paving machine.

FIG. 1 is an illustration of a paving machine 10. Although the paving machine 10 is depicted in the drawings as an asphalt paver, the presently disclosed systems may be used on any kind of paving machine for any kind of paving material that may form a layer of material on a paving surface 12, or in any other construction or mining equipment where power is supplied to mechanical systems of the machine. The paving machine 10 includes a tractor 14 having a power source 16, such as a gas turbine engine, a gas or diesel internal combustion engine, a motor or the like, one or more fraction devices 18, and a hopper 20 for containing paving material. In contrast to previous machines where the traction devices 18 may be operatively coupled to the power source 16 by a transmission mechanism (not shown) to drive the traction devices 18 and propel the paving machine 10, the traction devices 18 may be driven by electric motors receiving power from an integrated generator as discussed further below. Although the traction devices 18 are shown in the drawings as tracks 18 on either side of the tractor 14, the traction devices 18 could alternatively be wheels or any other type of traction devices driven by a single propulsion unit or individual propulsion units. The traction devices 18 could also be combinations of different types of traction devices. For example, the paving machine 10 could include tracks at the rear of the tractor 14 and wheels at the front of the tractor 14 that may or may not be independently driven to assist the rear tracks in propelling the paving machine 10.

The paving machine 10 also includes an operator station 22 for one or more operators. The operator station 22 includes a seat 24 and an operation console 26 that may be mounted on a pedestal 28. The operator station 22 includes a tractor controller or electronic control module (ECM) 30 as well as a human-machine interface 32 for accepting user input and displaying information to the operator. The human-machine interface 32 may have a combination of buttons, switches, dials, levers, touch screens and other control devices that may allow the operator to input commands to the tractor ECM 30 for controlling the operation of the various components of the paving machine 10. The paving machine 10 further includes a screed 34 attached to tractor 14 by tow arms 36 and towed behind tractor 14 to spread and compact the paving material into a mat 38 on the paving surface 12. The screed 34 may include one or more augers 40 for spreading the paving material to the lateral extents of the screed 34, as well as a tamper assembly 42 and a screed assembly 44 for pre-compacting, compacting and more finely smoothing the paving material onto the paving surface 12.

Figure 2:
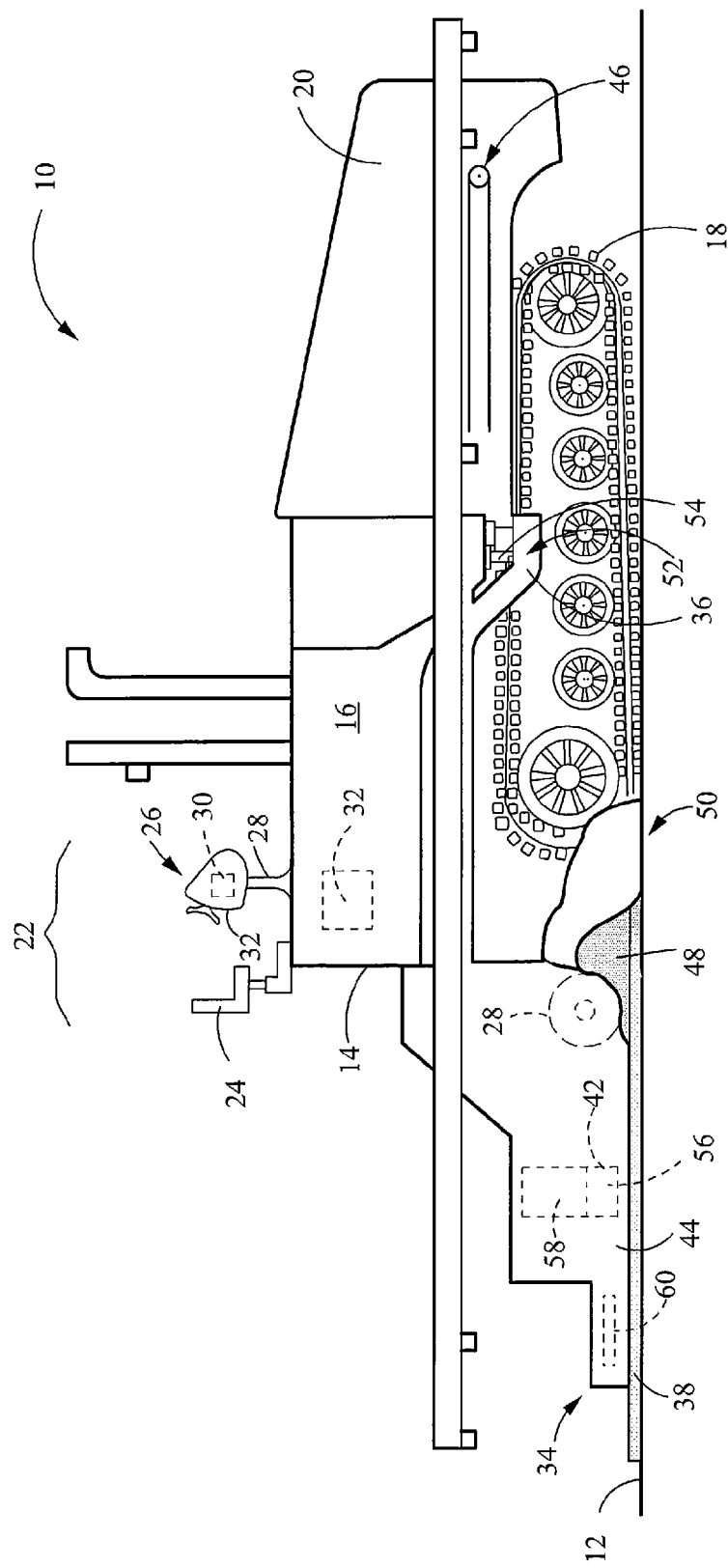
FIG. 2 is a side view of the paving machine of FIG. 1.

On the tractor 14, the hopper 20 of the paving machine 10 contains the paving material that is to be formed into the mat 38 on the paving surface 12. The paving material may be dumped into the hopper 20 at the front of the paving machine 10 from trucks that deliver the paving material to a work site. Referring to FIG. 2, the paving machine 10 may include one or more conveyors 46 at the bottom of the hopper 20. The conveyors 46 may be positioned side-by-side and run parallel to one another proximate the center of the hopper 20 along a midline of the paving machine 10. The hopper 20 is generally configured to feed the paving material from the sides of the hopper 20 toward the center and the conveyors 46 may transport paving material from the hopper 20 to the rear of the tractor 14 where it may be dropped behind the tractor 14, in front of the screed 34, and onto the paving surface 12 in a pile 48 (shown in a cut away portion 50 of FIG. 2). As the paving machine 10 travels forward, the pile 48 may be evenly spread by the augers 40 and compacted by the tamper assembly 42 and the screed assembly 44 of the heated screed 34. At times, some paving material at the outward sides of the hopper 20 may not feed down onto the conveyors 46, and instead accumulates at the sides of the hopper 20. In such cases, the accumulated material may be funneled onto the conveyors 46 by articulating the left and right sides of the hopper 20 using actuators (not shown) to raise the sides together or independently in the motion indicated by the arrows in FIG. 1.

During use, the operator employs the augers 40, the tamper assembly 42 and the screed assembly 44 to spread the pile 48 evenly, and to pre-compact and compact the paving material into the mat 38 on the paving surface 12. The screed 34 is shown in the figures as a floating-type screed. However, the screed 34 may be any type of screed for any type of paving material. The screed 34 is attached to the tractor 14 at tow points 52 by the tow arms 36. The height of the screed 34 is adjusted by raising and/or lowering the tow arms 36 at the tow points 52 with screed height actuators 54. The screed height actuators 54 may be any suitable actuators, such as, for example, electro-mechanical linear actuators. When the paving machine 10 is in motion, the screed 34 floats on a layer of paving material at a substantially consistent height relative to the height of the tow arms 36 at tow points 52. The operator is able to adjust the height of the screed 34 during the paving job via appropriate controls at the operation console 26 as discussed further below.

The tamper assembly 42 is positioned in the aft of the augers 40 and configured to pre-compact the paving material exiting the augers 40. For example, the tamper assembly 42 may employ one or more tamper bars 56, such as arranged in a single or a dual tamper configuration, or any other device or mechanism ordinarily used in the art, which is caused to vibrate or otherwise controlled to repeatedly strike down on the paving material, by an associated vibratory mechanism 58. The screed assembly 44 is positioned in the aft of the tamper assembly 42 and includes one or more screed plates, or the like, configured to smooth the paving material exiting the tamper assembly 42. Moreover, the screed plates are caused to move or vibrate by an associated vibratory mechanism or mechanisms 60 in a manner that enables further compaction of the paving material onto the paving surface 12. Each of the vibratory mechanisms 58, 60 can be implemented using any one or more of a variety of designs familiar to those of skill in the art. Furthermore, each of the vibratory mechanisms 58, 60 may be operated independently or in conjunction with one another. Although not shown, the screed assembly 44 can also include any one or more of a main screed frame, screed extenders, accessory extensions, such as bolt-on extensions, or the like, each of which can be operatively coupled with the vibratory mechanism 60.

Figure 3:
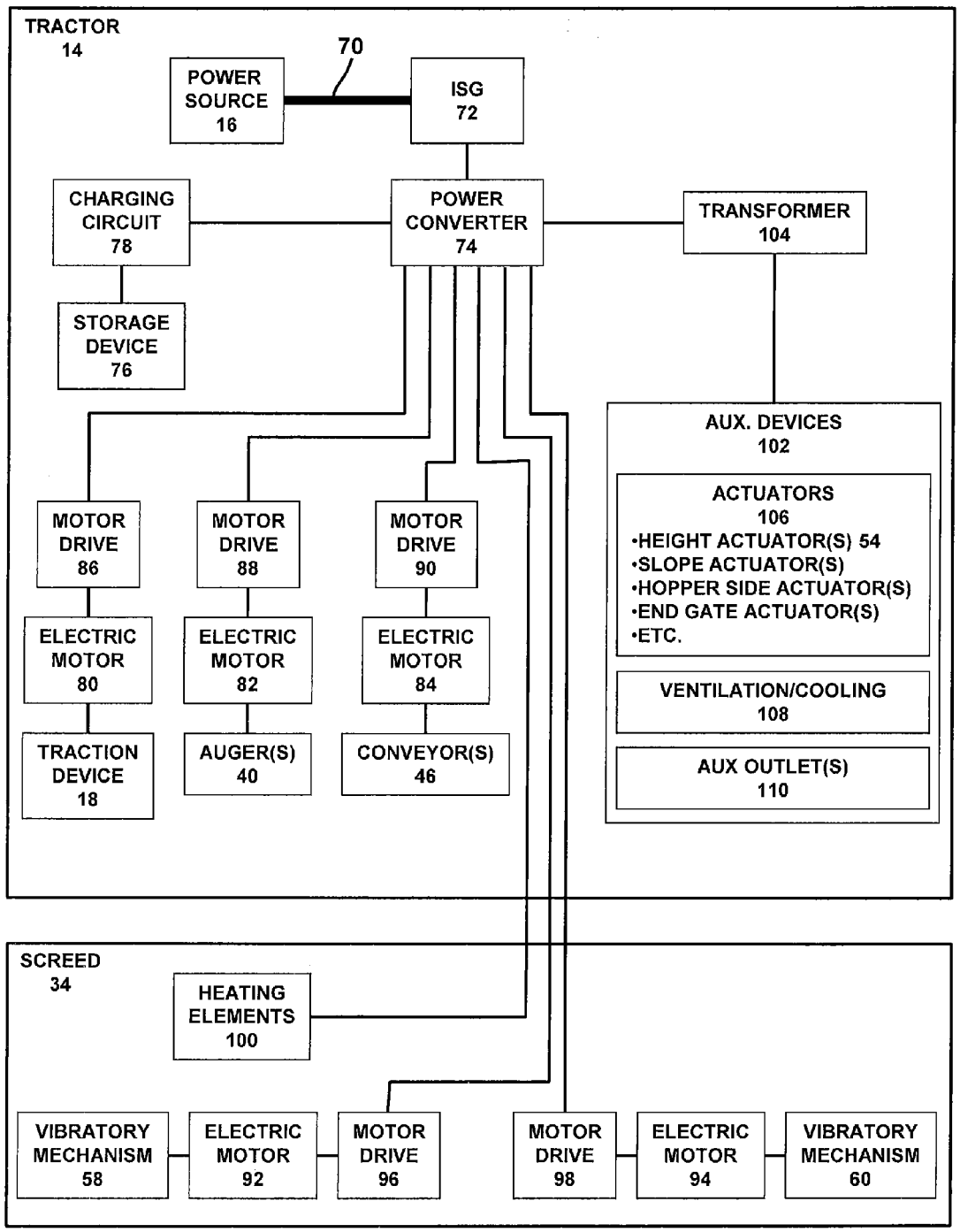
FIG. 3 is a schematic view of electrical power distribution components in accordance with the present disclosure implemented in the paving machine of FIG. 1.

In previous work machines, the mechanical components are operated by hydraulic motors and pumps powered by a pump drive coupled to an output shaft of the power source 16. In the paving machine 10 and other work machines in accordance with the present disclosure, mechanical components and systems in the tractor 14 and the screed 34 may be powered by different electrical power distribution arrangements. FIG. 3 illustrates one arrangement in accordance with the present disclosure of electrical power distribution components of the paving machine 10 for driving the mechanical and electro-mechanical systems of the paving machine 10. More generally, the arrangement shown in FIG. 3 serves to convert mechanical power that is output by the power source 16 into adequate electrical power that is converted back into mechanical power suited to drive the traction devices 18, the augers 40, the conveyors 46, the screed height actuators 54 and the vibratory mechanisms 58, 60 of the tamper and screed assemblies 42, 44, respectively, and other systems. More particularly, a rotating output shaft 70 of the power source 16 has an input shaft (not shown) of an integrated starter generator (ISG) 72 operatively coupled thereto.

The input shaft of the ISG 72 may be coupled directly and continuously to the output shaft 70 via any one or more of belts, intermediate drive shafts, or gear drives, or indirectly and selectively through a transmission, clutch or other mechanism. Particular connection arrangements for converting rotation of the output shaft 70 of the power source 16 into rotation of the input shaft of the ISG 72 will be apparent to those skilled in the art and are contemplated by the inventors as having use in paving machines 10 in accordance with the present disclosure. In the present embodiment, the ISG 72 may be a switched reluctance generator that may be, for example, of the type disclosed in Susitra, et al., Switched Reluctance Generator—Modeling, Design, Simulation, Analysis and Control—A Comprehensive Review, Int'l J. Computer Appls., Vol. 1, No. 2, pp. 10-16 (2010) and Hrabovcova et al., Output Power of Switched Reluctance Generator with regard to the Phase Number and Number of Stator and Rotor Poles, Elec. & Elec. Eng'g, No. 3, pp. 25-30 (2011), which are expressly incorporated by reference herein. A switched reluctance generator such as those described in the references can provide more power in a smaller package relative to the currently used generators, thereby facilitating integration of the ISG 72 into the tractor 14.

In response to mechanical input, and more particularly rotational input, received from the power source 16, the input shaft and thus a rotor (not shown) within the ISG 72 may be caused to rotate relative to a corresponding stator (not shown). Electromagnetic interaction between the poles of the rotor and the stator may generate electrical signals, for instance, alternating current (AC) in one or more phases, to be communicated to an input of one or more power converters 74. In turn, the power converters 74 convert, process, condition, regulate, or otherwise generate appropriate electrical output signals to be sourced to the mechanical and electro-mechanical systems of the tractor 14 and the screed 34.

The paving machine 10 may be configured to store a portion of the electrical power for use in starting the power source 16, powering the electrical systems when the ISG 72 is not being driven by the power source 16, or provide additional electrical power as necessary to meet short term power requirement spikes during the operation of the paving machine 10. The power converters 74 may be capable of diverting all or a portion of the electrical power for charging or storing electrical energy within an energy storage device 76, such as a battery within the tractor 14. Specifically, the power converters 74 supply a conditioned AC signal to a charging circuit 78 that may employ transformers, rectifiers, regulators, and the like, adapted to convert the AC signal into a suitably conditioned DC signal for charging the energy storage device 76 until the storage device 76 is fully charged. The power converters 74 are also configured to be able to draw power from the energy storage device 76 through the charging circuit 78 when necessary to provide electrical power to the ISG 72 and the systems of the paving machine 10 as will be discussed further below.

As further shown in FIG. 3, the various mechanical elements of the tractor 14, such as the traction devices 18, the auger(s) 40 and the conveyor(s) 46, are driven by associated electric motors 80, 82, 84, respectively, and each electric motor 80, 82, 84 is powered by an associated motor drive 86, 88, 90. The electric motors 80, 82, 84 maybe, for example, one-phase or three-phase AC induction motors, and the motor drives 86, 88, 90 may be AC motor drives configured to convert the DC signals supplied by the power converters 74 into appropriate AC signals for operating the one-phase or three-phase AC induction motors 80, 82, 84. When commands are issued for the mechanical elements 18, 40, 46 to operate, the corresponding motor drives 86, 88, 90 receive DC signals from the power converters 74, and convert the DC signal into an AC signal appropriate for driving the associated electric motor 80, 82, 84. The AC signals in turn generate electromagnetic fields within the stators (not shown) of the electric motors 80, 82, 84 which cause the corresponding rotors (not shown) to rotate and mechanically drive the mechanical elements 18, 40, 46 attached thereto. In a similar manner in the screed, each vibratory mechanism 58, 60 is driven by an associated electric motor 92, 94, and each electric motor 92, 94 is powered by an associated motor drive 96, 98 that receives DC signals from the power converters 74.

While only one arrangement is depicted in the drawings, other arrangements for operating the mechanical elements 18, 40, 46, 58, 60 of the paving machine 10 will be readily apparent to persons of ordinary skill in the art. In other modifications, for example, each of the mechanical elements 18, 40, 46, 58, 60 may be driven by other types of electric or AC induction motors having more or less phases than described herein. In other alternatives, the mechanical elements 18, 40, 46 of the tractor 14 may be operated by a single electric motor that is further driven by a single motor drive, and the mechanical elements 58, 60 of the screed 34 may be operated by a single electric motor that is further driven by a single motor drive. In further alternatives, a single motor drive may be used to drive all of the electric motors 80, 82, 84, 92, 94. In still further alternative embodiments, the power converters 74 may be configured to supply AC signals directly to the electric motors 80, 82, 84, 92, 94 sufficient to bypass the need for the motor drives 86, 88, 90, 96, 98.

In response to electrical input received from the ISG 72, the power converters 74 are also capable of supplying or outputting different electrical signals to operate other components of the tractor 14 and the screed 34 as shown in FIG. 3. For example, the power converters 74 may supply one or more DC signals to operate heating elements 100 associated with the screed 34 and the screed assembly 44. The power converters 74 in FIG. 3 are also capable of supplying AC or DC signals to any number of other auxiliary devices 102 associated with the paving machine 10. In the particular embodiment of FIG. 3, for example, the power converters 74 supply AC signals to a transformer 104 that may in turn supply correspondingly adjusted AC signals to one or more actuators 106, ventilation and cooling systems 108, auxiliary power outlets 110, and the like. The actuators 106 may include any one or more of the screed height actuators 54, hopper articulation actuators, crowning actuators, slope actuators, screed extender height actuators, endgate actuators, or any other actuators commonly used in association with paving applications. The function of the screed height actuators 54 and hopper articulation actuators are discussed above. Crowning actuators may be used to adjust a crown angle or a general curvature of the screed 34. Additionally, slope actuators may be used to adjust a slope of the screed 34, for example, by adjusting a position or slope of the extenders that are attached to the screed 34, or any other suitable form of screed support. Similarly, screed extender height actuators may be used to adjust the height of the extenders attached to the screed 34. Endgate actuators may be provided on paving machines 10 with optional endgates (not shown) disposed at the ends of the screed 34. The ventilation and cooling systems 108 may provide pumps, fans, or the like, which may be driven by the AC signal supplied by the power converters 74 and/or the transformer 104 to facilitate air circulation through the tractor 14 and over heat generating elements of the tractor 14. Further, the auxiliary power outlets 110 may provide one or more electrical outlet panels disposed on the paving machine 10. The mechanical elements and actuators of the tractor 14 and the screed 34 are exemplary of components of the paving machine 10 that may be hydraulically powered in presently-known paving machines and that may be converted to being electrically powered in paving machines 10 in accordance to the present disclosure. Those skilled in the art will understand that virtually any other hydraulically powered element or actuator in presently-known paving machines may be converted to being electrically powered in a similar manner, such as front wheel assists, screed, two point and auger height actuators, screed extension actuators, and the like, and such conversions are contemplated by the inventors as having use in paving machines 10 in accordance with the present disclosure.

Figure 4:
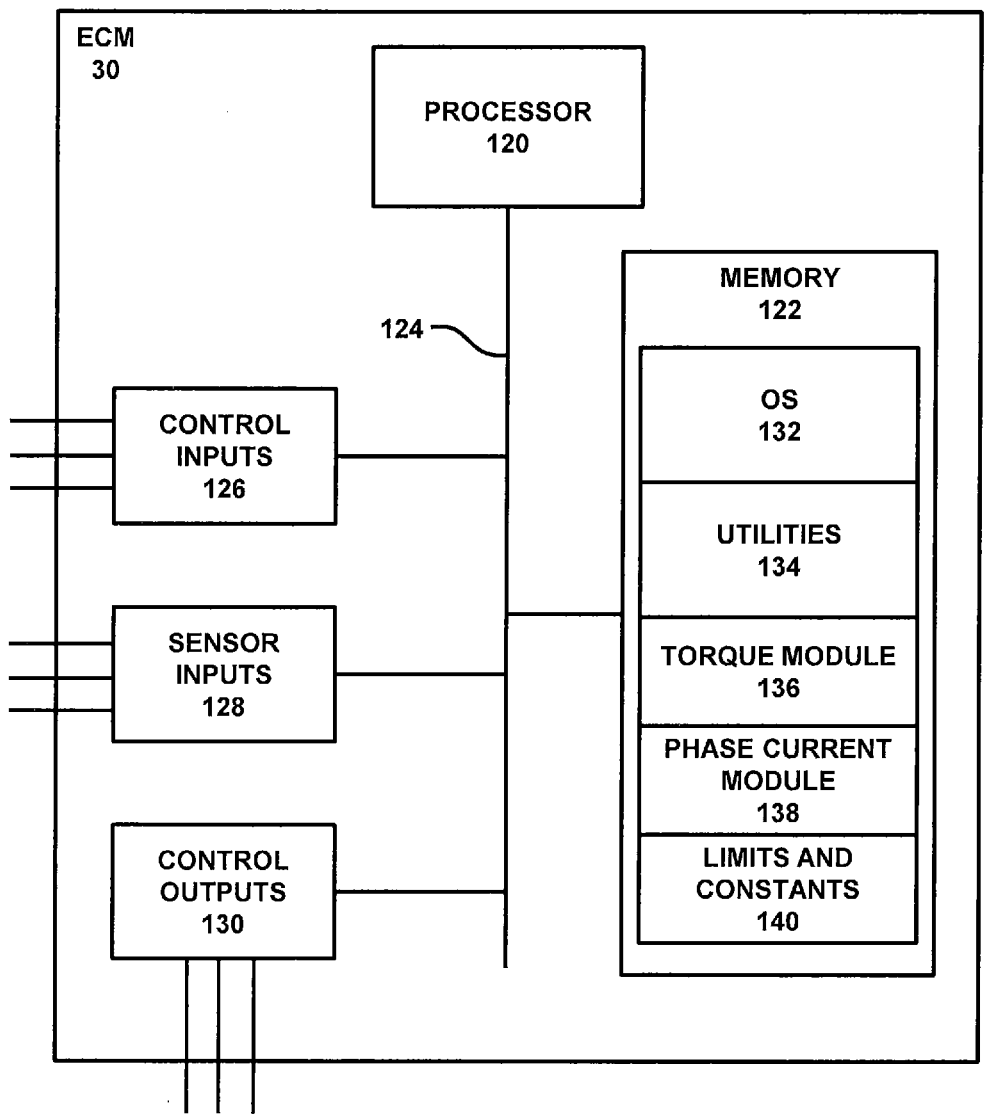
FIG. 4 is schematic view of the screed heat control components in accordance with the present disclosure implemented in the paving machine of FIG. 1.

FIG. 4 is an exemplary embodiment of the ECM 30 and other control elements of the paving machine 10. The ECM 30 may include, among other elements, a processor 120 and a memory 122 coupled to each other by a data bus 124. The ECM 30 may also be operatively coupled to a control input 126 that relays requests by an operator for a particular action input at one of the human-machine interfaces 32, such a request for forward propulsion. The ECM 30 may also be operatively connected to sensor inputs 128 such as position sensors on the output shaft 70, the ISG 72 and/or the electric motors 80, 82, 84, 92, 94 that receive signals indicative of the position of the rotating elements for use in calculating winding current settings. The sensor inputs 128 may also include temperature sensors, current and voltage sensor, and the like that may be necessary for monitoring and controlling the operation of the elements and systems of the paving machine 10. The ECM 30 may also be operatively coupled to control outputs 130 used to transmit control signals to control the actuation and operation of the various elements of the paving machine such as the power converters 74, the electric motors 80, 82, 84, 92, 94 and the auxiliary devices 102.

The processor 120 may be any of a number of known computer processor architectures, including, but not limited to, single chip processors or conventional computer architectures. The memory 122 may be any combination of volatile and non-volatile memory, including rotating media, flash memory, conventional RAM, ROM or other non-volatile programmable memory, but does not include carrier waves or other propagated media. The ECM 30 may also include a communication port (not shown) providing support for communication with external devices, such as another engine computer, body electronics (not shown), or central control stations or devices.

The memory 122 may have modules containing computer-executable instructions for various operational and control functions and may include an operating system 132 and utilities 134 used, for example, for sending and receiving signals and basic operational tasks. The memory 122 may also include a torque module 136 that processes operator inputs to calculate a requested torque output for the electric motors 80, 82, 84, 92, 94. A phase current module 138 may take data from the torque module 136 and use rotor position data and torque characterization data from the sensor inputs 128 for the electric motors 80, 82, 84, 92, 94 to calculate a required phase current to achieve the requested torque output. Another module 140 may contain limits and constraints used by the phase current module 138 to make decisions about maximum or other threshold current limits and alternate phase torque capabilities for powering the electrical components.

INDUSTRIAL APPLICABILITY

The paving machine 10 and other work machines having ISGs 72, power converters 74 and other electrical power components implemented similarly as described above may serve to reduce or eliminate hydraulic systems previously used to convert power output by the power source 16 into the operation of the mechanical and electro-mechanical systems of the work machines. The configurations of the work machines in accordance with the present disclosure may also facilitate the elimination of redundant components of the work machines and thereby provide savings in complexity, power consumption, cost, space utilization and machine weight, and increase the overall efficiency of the work machines.

When an operator starts up the paving machines 10, the output shaft 70 of the power source 16 drives input shaft and rotor of the ISG 72 relative to the stator to generate AC power. The AC power generated by the ISG 72 is turn output to the power converters 74 for conditioning prior to transmission to the electrical and electro-mechanical components of the paving machine 10. As the power source 16 is running and the ISG 72 is generating AC power, the ECM 30 monitors control signals from the control inputs 126 and the sensor inputs 128 to determine the manner in which the power converters 74 will distribute the AC power within the paving machine 10 according to a specified power distribution strategy that may be stored in the memory 122 and accessed by the processor 120. For example, during startup of the paving machine 10 and before the operator begins operating or driving the paving machine 10, the ECM 30 may determine that the power generated by the ISG 72 may be routed to and stored in the storage device 76 for later use. In this case, the ECM 30 may output control signals to the control outputs 130 for the power converters 74 to output DC power to the charging circuit 78 for delivery to the storage device 76. The storage device 76 may have associated sensors capable of determining the charge stored within the storage device 76 and transmitting signals to the corresponding sensor input 128 of the ECM 30 having values indicative of the measured charge of the storage device 76. When the storage device 76 is charged to a predetermined maximum charge level, the ECM 30 may cause the power converters 74 to cease outputting power to the storage device 76. If no other devices require power from the ISG 72, the ECM 30 may cause a corresponding transmission, clutch or other similar device to disengage the ISG 72 from the output shaft 70 of the power source 16 to eliminate an unnecessary parasitic load on the power source. 16.

As the operator turns on systems at the human-machine interfaces 32, the ECM 30 receives control signals at the control inputs 126 and determines the sources to be used to power the systems (ISG 72 and/or storage device 76) and the distribution of the drawn power to the operating systems. Consequently, when the ventilation and cooling systems 108 are turned on by the operator, the ECM 30 may determine that power from the storage device 76 can run the systems 108 without additional power generated by the ISG 72, at least in the short term. In response, the ECM 30 may transmit control signals via the control outputs 130 to the power converters 74, and the charging circuit 78 if necessary, to draw power from the storage device 76 and output DC power to the transformer 104 for the ventilation and cooling systems 108 in which air flow may be created by a corresponding DC motor. At the same time, the ECM 30 may output control signals to the ventilation and cooling systems 108 with a specified motor speed or air flow rate to be provided by the systems 108. The systems 108 may include corresponding sensors, such as motor speed sensors, air flow sensors, temperature sensors and the like, that may provide feedback to the ECM 30 via the sensor inputs 128 that are used by the ECM 30 to determine whether the systems 108 are operating within an acceptable operating range dictated by the control signals. If the systems 108 are not operating within the acceptable range, the ECM 30 may adjust the control signals to the power converters 74, the charging circuit 78, the transformer 104 and/or the systems 108 to adjust the amount of power provided to the systems 108 as necessary to move the systems 108 into the acceptable operating range. Such adjustments may necessitate engaging the ISG 72 instead of or in addition to drawing power from the storage device 76 to meet the requirements for the systems 108. Similar power transfer and control strategies may be executed to operate the other auxiliary devices 102.

Similar power transfer and control strategies may also be executed to operate the components having greater power consumption requirements, such as the traction devices 18, the augers 40, the conveyors 46, and the vibratory mechanisms 58, 60. When the operator engages the traction devices 18 at the human-machine interface 32 to begin propelling the paving machine 10, the ECM 30 receives control signals at the control input 126 indicating the machine speed commanded by the operator. In response, the ECM 30 determines the power required to propel the paving machine 10 at the commanded speed and outputs control signals from the control outputs 130 to cause the input shaft of the ISG 72 to be coupled to the output shaft 70 of the power source 16, to cause the power converters to 74 to receive the AC power from the ISG 72 and output DC power to the motor drive 86, and to cause the electric motor 80 to operate at the appropriate speed to cause the traction devices 18 to propel the paving machine 10 at the commanded speed. The traction devices 18 and/or the electric motor 80 may include corresponding speed or torque sensors providing feedback to the ECM 30 via the sensor inputs 128 indicating whether the paving machine 10 is being propelled at the commanded speed. If the fraction devices 18 or electric motor 80 are moving too slow, or the torque applied to the electric motor 80 is greater than expected, the ECM 30 may cause more power to be delivered to the electric motor 80 to increase the speed of the paving machine 10. Similarly, if the traction devices 18 or electric motor 80 are moving too fast, or the torque applied to the electric motor 80 is less than expected, the ECM 30 may cause less power to be delivered to the electric motor 80 to decrease the speed of the paving machine 10. Similar control strategies may be executed when the operator issues commands for the conveyors 46 to deliver material from the hopper 20 to the augers 40, for the augers 40 to spread the material behind the tractor 14, and for the tamper assembly 42 and the screed assembly 44 to compact the material under the screed 34.

The configuration of the work machine with the ISG 72 and the storage device 76 may allow for the elimination of potentially redundant components of the electrical system of the machine 10. For example, the power from the ISG 72 and the storage device 76 may be used for charging a battery of the machine, if one is still necessary, and powering other electrical systems such as the displays, lights and other sensory perceptible output devices of the machine 10. With these power sources, the need for a separate alternator is eliminated. Moreover, a starter motor for turning over the engine is unnecessary. The ECM 30 may be configured with a power source startup strategy for temporarily converting the ISG 72 into an electric motor to turn over the power source 16 during starting. When the ECM 30 detects a startup command from the operator at the control input 126, the ECM 30 may transmit control signals via the control outputs 130 to cause the rotor of the ISG 72 to be coupled to the output shaft 70 of the power source 16, and for the power converters 74 to receive power from the storage device 76 through the charging circuit 78 and transfer AC power to the stator of the ISG 72 to create a magnetic field causing the stator of the ISG 72 and, correspondingly, the output shaft 70 to rotate so that the power source 16 turns over.

The self-starting feature of the paving machine 10 in accordance with the present disclosure also allows the power source 16 to be shut down temporarily when the paving machine 10 would normally be idling and performing only lower power usage functions. For example, during the performance of paving a surface, the paving machine 10 may need to wait in place until a truck returns with more paving material to be loaded into the hopper 20. While waiting, the traction devices 18, augers 40, conveyors 46 and vibratory mechanisms 58, 60 may be shut off, and only low-power systems such as the ventilation and cooling systems 108 are operating and can be powered by the storage device 76. Upon detecting the idling, low-power condition where no power is required from the power source 16, the ECM 30 may issue control signal via the control outputs 130 to cause the power converters 74 to distribute power from the storage device 76 as necessary, and to cause the power source 16 to shut down and thereby conserve fuel. When the ECM 30 later detects that the charge in the storage device 76 is insufficient to meet the electric power demand of the systems, or detects commands for the operator to operate systems in a manner that requires more power, the ECM 30 may issue commands causing the startup sequence for the power source 16 discussed above to restart the power source 16 and maintain the coupling of the ISG 72 to generate the necessary power to operate the paving machine 10 and its systems as commanded.

During operation of the paving machine 10 in accordance with the present disclosure, short term power requirement spikes occur that may exceed the power available from the ISG 72 at the current speed of the output shaft 70 of the power source 16. Such spikes may occur, for example, when the traction devices 18, the augers 40 or the conveyors 46 are initially engaged. Additional power is required to start the components in motion, and then the required power drops to an approximately steady state value at the commanded operating speed. To adequately meet the short term power requirements, the ECM 30 may be programmed with a peak shaving strategy for efficiently distributing the available electrical power. The peak shaving strategy may offer at least three options for providing the necessary power to address the power spike. In a first option, the power output of the ISG 72 may be increased by increasing the speed of the input shaft and rotor. The speed increase may be accomplished by either increasing the speed of the power source 16 and the output shaft 70 by transmitting appropriate control signals from the ECM 30 to a throttle (not shown) of the power source 16, or by increasing a gear ratio in the connection between the output shaft 70 and the input shaft of the ISG 72 by transmitting control signals from the ECM 30 to cause a transmission or clutch to shift so that the input shaft of the ISG 72 rotates faster with the same speed of the output shaft 70. Once the short term power need is met and the required power reduces to that required for steady state operation, such as after the conveyors 46 have started up and are conveying material, the ECM 30 may output control signals to reduce the speed of the power source 16 and/or the ISG 72 to generate the required power.

In a second option for meeting the power spike, power may be drawn from the storage device 76 for the duration of the power spike. Upon detecting the onset of the power spike, the ECM 30 may transmit control signals to the power converters 74 and the charging circuit 78 to transmit power stored in the storage device 76 to the power converters 74 which in turn distribute the power from the storage device 76 and the ISG 72 to the operating components and systems. After the power spike, the ECM 30 may transmit control signals to the power converters 74 and the charging circuit 78 to cease transferring power from the storage device 76 and return to drawing power from only the ISG 72.

In a third power shaving option, the strategy may direct the ECM 30 to maintain the total power available, but divert power from lower priority systems or systems that may not adversely affect the performance of the paving machine 10 with a short term power reduction to the component causing the short term power spike. For example, when the operator issues commands for the traction devices 18 to begin propelling the paving machine 10, it may be acceptable to temporarily cut power to the screed heating elements 100 without adversely affecting the quality of the mat 38. When the command to engage the traction devices 18 is received at the control input 126, the ECM 30 may respond by outputting control signals to the power converters 74 to cease transferring power to the heating elements 100, and to begin transferring power to the motor drive 86 so that the electric motor 80 can begin driving the fraction devices 18. After the traction devices 18 overcome the inertia of the paving machine 10 and begin propelling the machine 10 forward, the ECM 30 may determine that the peak power demand has passed and transmit control signals to the power converters 74 to resume transferring power to the screed heating elements 100. The power shaving strategy may implement any one or a combination of these options for generating and transferring power to meet short term power spikes during operation of the paving machine 10.

The paving machines 10 and other work machines in accordance with the present disclosure provide improved performance over previous work machines utilizing hydraulic pumps to proved power to the mechanical systems of the machines. The electric motors implemented in the paving machines 10 are more efficient than the hydraulic pumps in previous machines, resulting in improved fuel efficiency in operating the power source 16. The electrical power systems eliminate the hydraulic connections within the tractor 14 and between the tractor 14 and the screed 34, including hoses and fittings. The reduction or elimination of the hydraulic pumps and connections, and the size reduction or elimination of the hydraulic tank creates space within the paving machine 10, and may allow reduction of the size of the paving machine 10 without compromising performance. Further, implementation of the peak shaving strategy for reducing engine loading may allow for downsizing of the engine and further improving the fuel efficiency of the paving machine 10. The paving machines 10 may be designed with combinations of 3-phase variable speed AC induction motors, 1-phase constant speed AC induction motors and DC motors as necessary to meet the speed and torque needs of the various systems of the paving machines 10.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

What is claimed is:

1. A paving machine for performing work at a work site, the paving machine comprising:
    an operator station;
    a power source having an output shaft;
    a generator operatively connected to the output shaft of the power source to drive the generator and produce alternating current (AC) power;
    a power converter operatively connected to the generator to transfer AC power between the generator and the power converter, and to output direct current (DC) power;
    a plurality of electric motors with each being operatively connected to the power converter to receive DC power therefrom;
    a plurality of mechanical components with each being operatively connected to a corresponding one of the plurality of electric motors; and
    a controller operatively connected to the operator station and the power converter,
    wherein the controller is configured to detect command signals from the operator station to actuate the plurality of mechanical components,
    wherein the controller is configured to cause the power converter to distribute power from the generator to the plurality of electric motors in response to detecting the command signals to actuate the plurality of mechanical components, and
    wherein the controller is configured to detect a first command signal from the operator station to actuate a first one of the plurality of mechanical components, to cause the power converter to distribute power from the generator to a first one of the plurality of electric motors corresponding to the first one of the plurality of mechanical components in response to detecting the first command signal from the operator station, to detect a second command signal from the operator station to actuate a second one of the plurality of mechanical components, to compare a total power requirement for operating the first and second ones of the plurality of mechanical components to a generated power amount by the generator, and to cause the power converter to decrease a first output power to the first one of the plurality of electric motors and to output a second output power to a second one of the plurality of electric motors corresponding to the second one of the plurality of mechanical components in response to determining that the total power requirement is greater than the generated power amount.

2. The paving machine of claim 1, comprising an energy storage device operatively connected to the power converter to transfer DC power between the power converter and the energy storage device, wherein the controller is configured to compare a generator power output amount to a mechanical component power requirement amount, and wherein the controller is configured to cause the power converter to output DC power to the energy storage device to increase an electrical charge in the energy storage device in response to determining that the generator power output amount is greater than the mechanical component power requirement amount.

3. The paving machine of claim 2, wherein the controller is configured to cause the power converter to receive DC power from the energy storage device and to distribute the power from the generator and the energy storage device to the plurality of electric motors in response to determining that the generator power output amount is less than the mechanical component power requirement amount.

4. The paving machine of claim 1, comprising:
    a transformer operatively connected to the power converter to receive electrical power therefrom; and
    a plurality of auxiliary devices operatively connected to the transformer to receive DC power therefrom to operate the plurality of auxiliary devices,
    wherein the controller is configured to detect auxiliary device actuation commands from the operator station to actuate the plurality of auxiliary devices, and
    wherein the controller is configured to cause the power converter to distribute power from the generator to the transformer for actuation of the plurality of auxiliary devices in response to detecting the auxiliary device actuation commands.

* * * * *